United States Patent [19]
McGraw

[11] Patent Number: 6,129,799
[45] Date of Patent: Oct. 10, 2000

[54] METHOD AND APPARATUS FOR MAKING FLUID-FILLED BLADDER

[76] Inventor: John J. McGraw, 37 Deer Park Rd., Manitowish Waters, Wis. 54545

[21] Appl. No.: 09/135,081

[22] Filed: Aug. 17, 1998

[51] Int. Cl.[7] .............................. B32B 1/04; B32B 1/06; B30B 9/28

[52] U.S. Cl. ........................... 156/87; 156/146; 156/292; 425/519

[58] Field of Search .................... 156/145, 146, 156/292, 87; 249/170, 171; 425/518, 519

[56] References Cited

U.S. PATENT DOCUMENTS

| | | | |
|---|---|---|---|
| 1,263,141 | 4/1918 | Strauss | 156/292 |
| 2,249,612 | 7/1941 | Kalowski | 156/146 |
| 2,422,979 | 6/1947 | Pecker . | |
| 2,670,501 | 3/1954 | Michiels | 156/145 |
| 2,936,816 | 5/1960 | Lang . | |
| 3,692,613 | 9/1972 | Pederson . | |
| 3,884,744 | 5/1975 | Ranocha et al. . | |
| 4,007,838 | 2/1977 | Awad . | |
| 4,447,373 | 5/1984 | Chappell | 156/146 |
| 4,539,793 | 9/1985 | Malek . | |
| 4,660,354 | 4/1987 | Lancaster et al. . | |
| 5,035,758 | 7/1991 | Degler | 156/272.2 |
| 5,239,723 | 8/1993 | Chen . | |
| 5,254,197 | 10/1993 | Klems . | |
| 5,262,468 | 11/1993 | Chen . | |
| 5,324,222 | 6/1994 | Chen . | |
| 5,334,646 | 8/1994 | Chen . | |
| 5,336,708 | 8/1994 | Chen . | |
| 5,500,067 | 3/1996 | Jenkner | 156/146 |
| 5,554,422 | 9/1996 | Gill et al. . | |
| 5,633,286 | 5/1997 | Chen . | |

*Primary Examiner*—Michael W. Ball
*Assistant Examiner*—Gladys Piazza
*Attorney, Agent, or Firm*—Daniel N. Lundeen

[57] ABSTRACT

There is disclosed a method and apparatus for making bladders filled with a high viscosity fluid or gel. An elastic film is placed over a cavity formed in a first mold half and vacuum drawn into the shape of the cavity. A quantity of fluid is then deposited on the first film in the cavity and the first film and fluid are overlaid with a second film. The second mold half is placed in register with the first mold half to mate opposed sealing surfaces along an outer perimeter of the cavity. The vacuum is released to expel air from the cavity between the first and second films through channels corresponding to transverse grooves formed in the sealing surface of the first mold half. The first and second films are then welded at the sealing surfaces to form a sealed bladder filled with the fluid, and the fluid-filled bladder is removed from the mold halves.

20 Claims, 2 Drawing Sheets

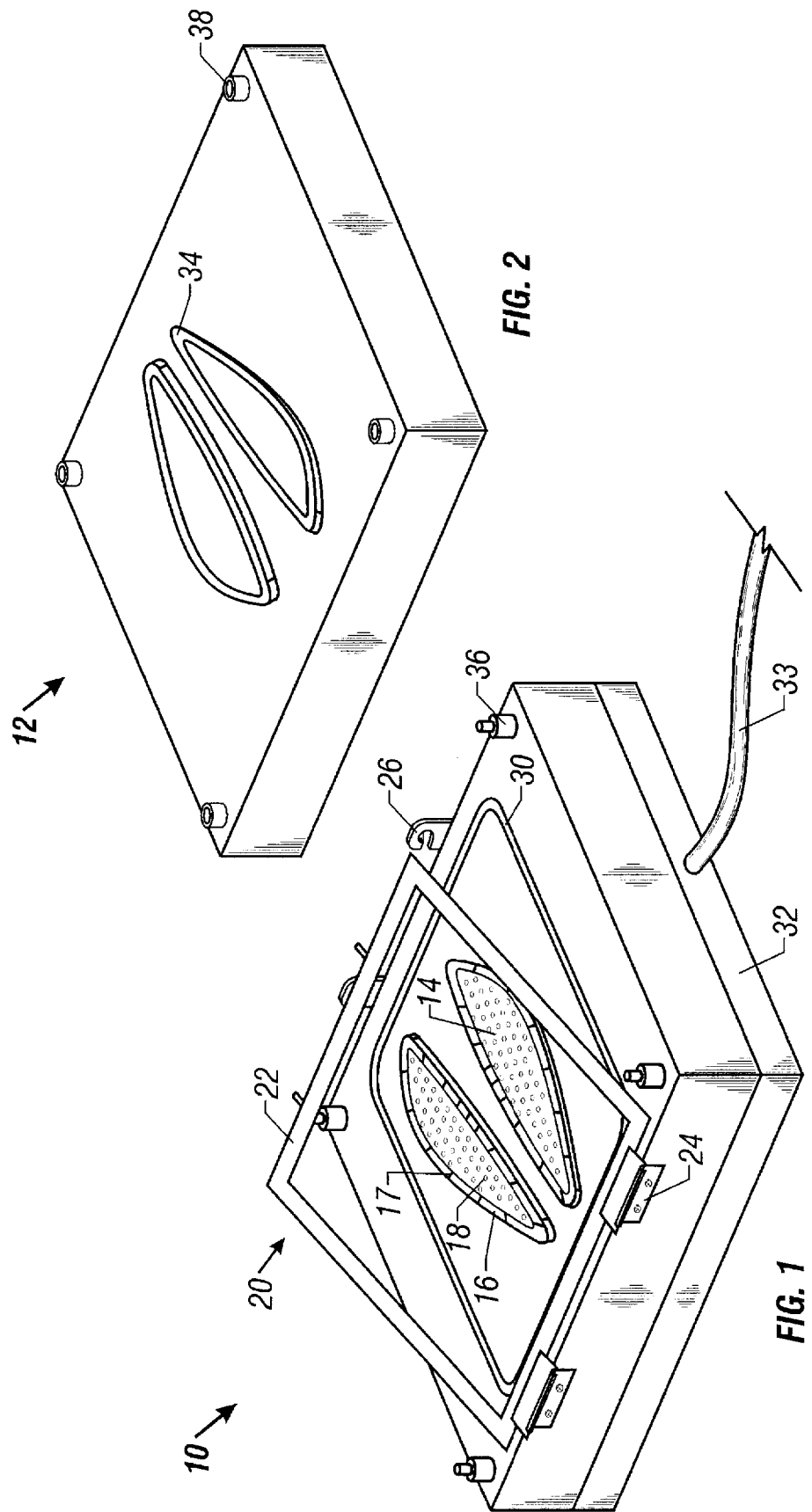

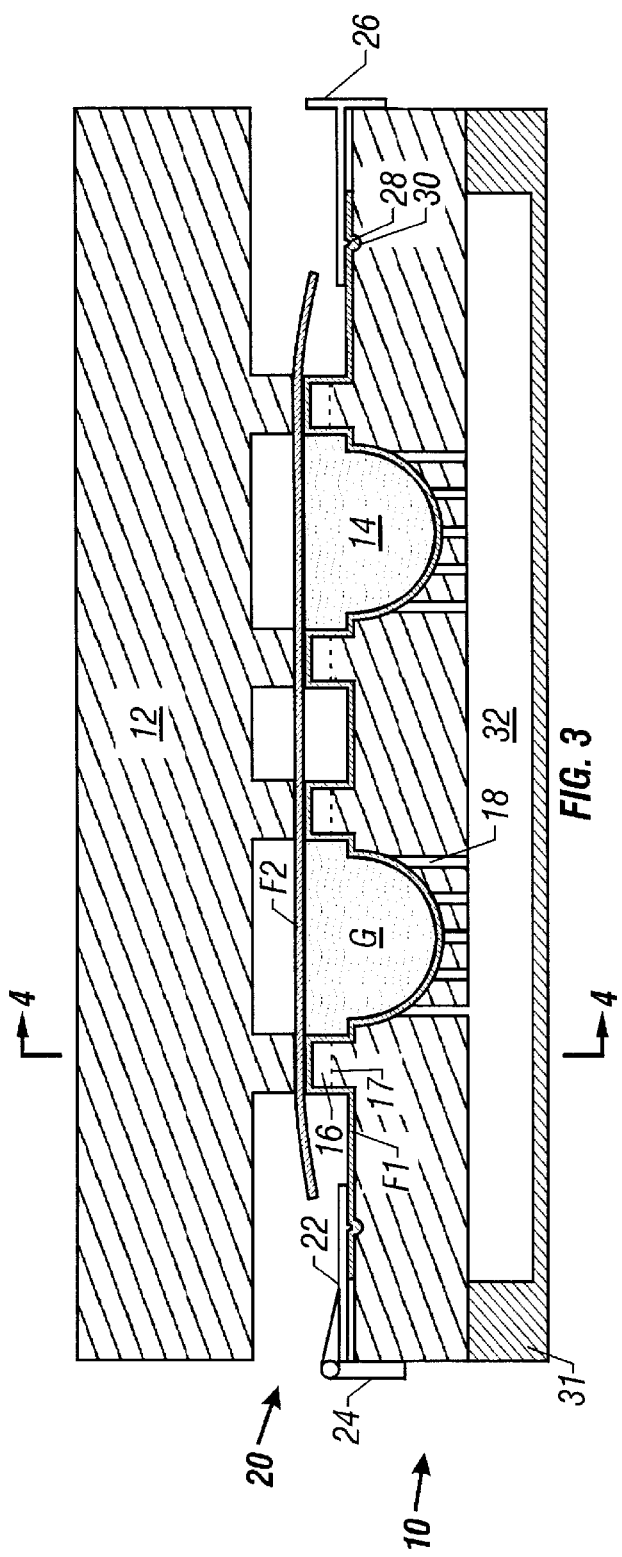
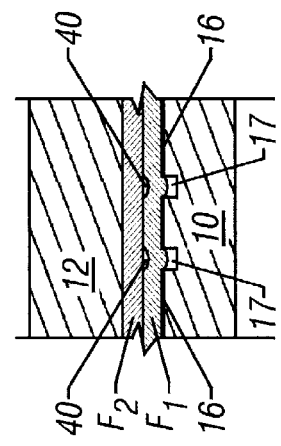

METHOD AND APPARATUS FOR MAKING FLUID-FILLED BLADDER

FIELD OF THE INVENTION

This invention relates to a method and apparatus for making fluid-filled bladders, particularly bladders filled with a high viscosity fluid or gel.

BACKGROUND OF THE INVENTION

Bladders comprising an outer film encapsulating a high viscosity fluid or gel are well known in the art. Such composite materials are disclosed, for example, in U.S. Pat. No. 5,633,282 to Chen. Such fluid-filled bladders are generally made by fusing together two layers of the film along an outer contour of the shape of the bladder, except for a fill port through which the high viscosity fluid or gel is injected into the bladder. Then, after the bladder has been filled through the fill port, the fill port is sealed. This method of forming the fluid-filled bladder greatly complicates the fabrication thereof. There is a need in the art for a method of fabricating the fluid-filled bladders without having to inject the fluid through a fill port and without having to seal or close the fill port as a separate step.

U.S. Pat. No. 2,422,979 to Pecker discloses apparatus for fabricating parts by bonding strips of material. Radio frequencies are used for sealing. Vacuum and pressure are applied to the material.

U.S. Pat. No. 2,936,816 to Lang discloses a method and apparatus for sealing thermoplastic containers using high frequency electrical energy and an electrode that moves up and down in a chamber.

U.S. Pat. No. 3,692,613 to Pederson discloses a liquid filled pouch that is sealed using an electric impulse.

U.S. Pat. No. 3,894,744 to Ranocha et al. discloses the use of a high frequency generator in an apparatus for welding shoe parts together.

U.S. Pat. No. 4,007,838 to Awad discloses a liquid sealed in a flexible bag. The bag is sealed using a heat seal.

U.S. Pat. No. 4,539,793 to Malek discloses internally burstable pouches that have material sealed in them using radio frequency energy.

U.S. Pat. No. 4,660,354 to Lancaster et al. discloses a method of filling and sealing RF-sealable packing containers.

U.S. Pat. No. 5,254,197 to Klems discloses the use of vacuum and microwave energy to produce a seat cushion.

U.S. Pat. No. 5,554,422 to Gill et al. discloses a container that is formed from a vacuum-formed top container portion and a vacuum-formed bottom container portion. The peripheral edges of the top and bottom container portions are melted by heater to form a completed container.

SUMMARY OF THE INVENTION

The present invention provides a method for sealing a fluid filled bladder. A sculptured cavity is formed in one side of a two-piece mold. A plurality of spaced apart holes open into the cavity and are in fluid communication with a vacuum source. There is a raised sealing surface around the perimeter of the cavity which has spaced apart transverse grooves. A vacuum seal is disposed outside the sealing surfaces. One side of a bladder polymer film having elastic recovery is placed over the cavity and drawn down into the cavity by applying the vacuum to the holes. A predetermined quantity of gel or other fluid is placed in the cavity in the first bladder film. A second film is placed over the first film to cover the cavity, and a second mated welding tool is placed in register with the first tool pressing the films together between the sealing surfaces. The vacuum is released and the elastic recovery of the first film forces any air out of the bladder through channels at the grooved points on the sealing surface. The air can escape, but the fluid is too viscous to flow through the groove points. Then the welding is effected along the perimeter of the bladder.

Broadly, the present invention provides a method for making a fluid-filled bladder. The method includes placing a first film having elastic recovery over a cavity formed in a first mold half and vacuum drawing an outer surface of the first film into register with an inner surface of the cavity so that the first film conforms to the shape of the cavity. The method then includes depositing a quantity of fluid onto an open face of the first film in the cavity, overlaying the first film and deposited fluid with a second film, and placing a second mold half in register with the first mold half to mate opposed sealing surfaces formed in the mold halves along an outer perimeter of the cavity. Then, vacuum is released from the cavity to relax the first film and expel any air from the cavity between the first and second films. The first and second films are welded at the opposed sealing surfaces to form a bladder filled with the fluid. The fluid filled bladder is removed from the mold halves.

To facilitate the drawing of the vacuum, a seal can be formed between the first film and the first mold half spaced outwardly from the cavity. The seal can be formed by a gasket or more preferably, a rigid frame hinged and clamped to the first mold half at opposite sides thereof.

The air is preferably expelled through channels corresponding to transverse grooves formed in a raised sealing surface in the first mold half. When the first and second films are compressed between the sealing surfaces of the respective first and second mold halves, the channels should be large enough to allow the air to be expelled, but small enough to inhibit passage of the fluid therethrough.

Registration on the first and second mold halves is preferably effected by inserting registration pins projecting from one of the mold halves into registration holes formed in the other of the second mold halves. Preferably, the first mold half is generally planar except for the cavity and the raised sealing surface thereof, and the second mold half is generally planar except for a raised sealing surface thereof. The quantity of fluid deposited onto the first film is preferably pre-measured.

In another aspect, the present invention provides an apparatus useful for making gel-filled bladders. The apparatus has first and second mold halves having opposing surfaces for mutual registration. A cavity is formed in the first mold. A vacuum source is provided in fluid communication with the cavity. A raised sealing surface is formed in the first mold half along a perimeter of the cavity. A raised sealing surface is formed in the second mold half opposing the raised sealing surface of the first half. A seal between the first film and the first mold half is spaced outwardly from the raised surface thereof. A dispenser is provided for depositing a predetermined quantity of fluid in the cavity. The first mold half preferably has registration pins projecting into corresponding registration holes formed in the second mold half. Transverse grooves can be formed in the raised sealing surface of the first mold half. The first mold half preferably has holes formed in the cavity which are connected to the vacuum source. The apparatus can also include an RF source for welding thermoplastic films together between the opposed raised sealing surfaces. The apparatus can also include a press for compressing the film between the sealing surfaces and/or a heater for heating the film between the sealing surfaces. The fluid dispenser preferably comprises a reciprocating cylinder in a piston.

In a further aspect, the present invention provides a method for making a gel-filled bladder using the apparatus just described which comprises the steps of: (a) overlaying a first film having memory characteristics onto the first mold half; (b) applying the vacuum source to draw the first film into the cavity; (c) dispensing the gel onto an open face of the film in the cavity; (d) overlaying the first film and gel with a second film and placing the second mold half to sandwich the film together between the opposing sealing surfaces; (e) releasing the vacuum from the cavity to allow any air to be expelled from the cavity; (f) welding the films together between the opposing sealing surfaces to form a gel-filled bladder; and (g) removing the gel-filled bladder from the mold halves. The method can also include trimming excess film from the gel-filled bladder removed from the mold halves. Depending on the film and gel materials, the welding can be effected by RF welding, an impulse heater, ultrasonic welding, inductive heating, hot bar sealing, or the like.

BRIEF DESCRIPTION OF THE DRAWINGS

FIG. 1 is a perspective view of a first mold half according to the principles of the present invention.

FIG. 2 is a perspective view of a second mold half for use with the first mold half of FIG. 1.

FIG. 3 is a sectional view of the assembled mold halves of FIGS. 1 and 2 with first and second films sandwiching a quantity of gel between the mold halves to form gel-filled bladders.

FIG. 4 is a cross-sectional view as seen along the lines 4—4 of FIG. 3 to show the channels (40) corresponding to the grooves (17).

DETAILED DESCRIPTION OF THE INVENTION

With reference to the illustrative embodiment of FIGS. 1—3 in which like numerals reference like parts, the apparatus includes first tool 10 and second tool 12 which generally have the same plan dimensions. The tools 10, 12 can be machined from a conventional RF welding material such as brass. First tool 10 generally conforms to a bottom half of a mold and has one or more cavities 14 formed in an upper face thereof. The cavities 14 generally have a shape corresponding to the desired shape of the bladder product and a volume corresponding to the quantity of gel or other fluid to be disposed within the bladder product.

Around each cavity 14, there is a raised perimeter surface 16 which corresponds to the desired edge seam in the resulting bladder product. The perimeter surface 16 is generally raised above the adjacent surface of the tool 10 to facilitate welding of first and second film layers together at the perimeter surface 16.

Within the cavities 14, there are a plurality of vacuum holes 18 which are provided to draw down a first film into the contoured surface of the cavity 14 to give a three dimensional body to the bladder product. To secure the first film to an upper surface of the first tool 10 and provide a contiguous seal around the cavities 14 there is provided a clamp 20 which includes a contiguous frame 22 secured at one edge by hinges 24 and at the opposite edge by clamp locks 26. The frame 22 is preferably made of a rigid plastic, although other suitable materials could similarly be employed. The frame 22 preferably has a contiguous protruding ridge 28 which corresponds to a groove 30 formed in the upper surface of the first tool 10. When the clamp 20 is secured in place by the clamp locks 26, the film is held in place and sealed fluid tight by the protrusion of the ridge 28 into the groove 30.

The vacuum holes 18, as previously mentioned, provide fluid communication to a vacuum chamber 32 below the first tool 12. The vacuum chamber 32 can conveniently be a reservoir in pan 31 which underlies and receives the tool 10. If necessary, a gasket (not shown) or other seal can be used between the pan 31 and tool 12 to form a fluid tight seal around the vacuum chamber 32. The vacuum chamber 32 is generally connected to a suitable vacuum source such as a vacuum pump (not shown) via line 33.

The second tool 12 has a raised surface 34 which corresponds as a mirror image to raised surface 16 on the first tool 10. First tool 10 has a plurality of registration pins 36 which protrude upwardly into registration holes 38 which are formed in second tool 12. For convenience, it is preferred to use four registration pins 36 and registration holes 38, one at each corner of the tools 10, 12.

In operation, a first film layer F1 is placed on the upper surface of first tool 10 underneath frame 22. The frame 22 is then locked in place over the first film and secured at clamp locks 26. The assembly of the tool 10 and vacuum chamber 32 is placed on the lower platen of a conventional welding machine (not shown). Vacuum is then applied to the vacuum chamber 32 and the film is drawn into the cavities 14 and conforms to the contour thereof. With the first film held in this condition, the cavity is filled with a predetermined quantity of high viscosity fluid or gel G. If desired, the volume of the cavity 14 can be precisely calculated and an exact quantity of the high viscosity fluid is introduced into each cavity 14 filling it to the same level repeatedly, but only once per bladder manufacture. This volume, thus, corresponds to the total final volume of the three dimensional gel-filled bladder product. A high viscosity fluid dispenser (not shown) preferably includes a piston in a cylinder such as a syringe or piston pump. The quantity of high viscosity fluid or gel can be accurately determined and repeated knowing the stroke and diameter of the piston.

Once the cavities 14 are filled, a second piece of film F2, generally identical to the first film F1, is placed over the first film to overlay the cavities 14, and the second tool 12 is secured to an upper platen of the welding machine and placed over the second film F2 so that the registration pins 36 and holes 38 match and the upper sealing surface 34 corresponds to lower sealing surface 16. The vacuum is then released. Elastic recovery of the first film F1 helps to expel air trapped in the putative bladder through channels 40 (see FIG. 4) corresponding to the grooves 17 formed in the sealing surface 16. The grooves 17 are small enough to allow air to escape, but the viscosity of the gel or other fluid generally prevents any gel from escaping. The welding process is then activated to weld the films F1, F2 together at the perimeter of the bladder. Again, the grooves 17 and channels 40 are small enough so as to allow sealing in the vicinity thereof, i.e. the grooves 17 do not interfere with the sealing process step. After welding, the bladder is removed from the first and second tools 10, 12 and any excess film can be removed by die cutting, for example. If a film of suitable Shore hardness is used, the excess can be removed or set for stripping during the welding process as is conventional in the art.

In the apparatus and method of the present invention, it is preferred to use radio frequency (RF) heat sealing. In this case the first tool 10 is generally machined from brass and placed on the bed plate of an RF welding machine. The second tool 12 is generally attached to the upper platen of the RF welding machine. Depending on the characteristics of the bladder and the film, the RF welding machine can use appropriate pressure, heating and cycle times such as pre-seal, seal and cool times.

Other welding processes which can be suitably employed include electrical impulse heating, ultrasonic welding, inductive heating, hot bar welding and the like. Where RF welding and/or ultrasonic welding are employed, it is important to use a suitable film material which is responsive to RF and/or ultrasonic frequencies as is known in the art. The film should also have suitable elastomeric properties to be conformed to the shape of the cavity 14 when the vacuum is applied, and elastic memory characteristics for elastic recovery when the vacuum is released to help expel the air from the cavity. For example, an 8 mil polyurethane film obtained under the trade designation ST-1522.008 from JPS Elastomerics Corp. can be suitably employed for RF welding. For other types of welding, and differing composites of liquid or gel, other thermoplastic elastomeric films may be employed to obtain the desired results.

Similarly, any suitable gel material or other high viscosity fluid can be used in the apparatus and method of the present invention. Preferably, the fluid or gel in its liquid state has a viscosity of at least 2,400 cps. For RF welding, however, we prefer to use a non-aqueous gel made from rubber and mineral oil which is not responsive to RF energy so that the gel does not expand during the RF welding of the film layers and prevent the film layers from coming together or causing air bubbles in the seal area. For aqueous gels the preferred welding method is impulse welding with quench cooling using low loss thermoplastics having low vapor transmission rates for the top and bottom film layers.

While the invention has been described with reference to the specific embodiments illustrated above, such embodiments are exemplary only. Various changes and modifications will occur to those skilled in the art in view of the foregoing description. It is intended that all such changes and modifications falling within the scope or spirit of the appended claims be embraced thereby.

What is claimed is:

1. A method for making a fluid-filled bladder, comprising:
   placing a first elastomeric film having elastic recovery over a cavity formed in a first mold half;
   vacuum drawing an outer surface of the first film into register with an inner surface of the cavity so that the first film conforms to the shape of the cavity;
   depositing a quantity of fluid comprising liquid or gel onto an open face of the first film in the cavity;
   overlaying the first film and fluid with a second film;
   placing a second mold half in register with the first mold half to mate opposed sealing surfaces formed in the mold halves along an outer perimeter of the cavity;
   expelling any air from between the first and second films in the cavity by releasing vacuum from the cavity to relax the first film;
   welding the first and second films between the opposed sealing surfaces to form a sealed bladder filled with the fluid; and
   removing the fluid-filled bladder from the mold halves.

2. The method of claim 1 further comprising forming a seal between the first film and the first mold half spaced outwardly from the cavity.

3. The method of claim 2 wherein the seal between the first film and the first mold half comprises a rigid frame clamped to an upper surface of the first mold half to secure the first film therebetween.

4. The method of claim 1 wherein the first and second films are compressed between the opposed sealing surfaces and air is expelled through channels corresponding to transverse grooves formed in the sealing surface of the first mold half.

5. The method of claim 4 wherein the channels are large enough to allow the air to be expelled and small enough to inhibit passage of the fluid.

6. The method of claim 1 wherein registration of the first and second mold halves is effected by inserting registration pins projecting from one of the first mold halves into registration holes formed in the other of the mold halves.

7. The method of claim 1 wherein the first mold half is generally planar except for the cavity and the sealing surface thereof and the second mold half is generally planar except for the sealing surface thereof, wherein the opposed sealing surfaces are raised with respect to the respective first and second mold halves.

8. The method of claim 1 wherein the quantity of fluid is premeasured.

9. Apparatus useful for making gel-filled bladders, comprising:
   first and second mold halves having opposing surfaces for mutual registration;
   a cavity formed in the first mold;
   a vacuum source in fluid communication with the cavity;
   a raised sealing surface formed in the first mold half along a perimeter of the cavity;
   a sealing surface formed in the second mold half opposing the sealing surface of the second mold half;
   a seal adjacent to a planar surface of the first mold half spaced outwardly from the sealing surface thereof;
   transverse grooves formed in the raised sealing surface of the first mold half.

10. The apparatus of claim 9 wherein one of the mold halves has registration pins projecting into corresponding registration holes formed in the other of the mold halves.

11. The apparatus of claim 9 comprising holes formed in the cavity connected to the vacuum source.

12. The apparatus of claim 9 further comprising an RF source for welding thermoplastic films together between the opposed sealing surfaces.

13. The apparatus of claim 12 further comprising a press for compressing the films between the sealing surfaces.

14. The apparatus of claim 12 further comprising a heater for heating the films between the sealing surfaces.

15. The apparatus of claim 9, further comprising a dispenser for depositing a predetermined quantity of liquid or gel on an open face of a film overlying the cavity.

16. The apparatus of claim 15 wherein the dispenser comprises a reciprocating cylinder in a piston.

17. A method for making a gel-filled bladder using the apparatus of claim 9, comprising the steps of:

overlaying a first film having elastic recovery onto the first mold half;

applying the vacuum source to draw the first film into the cavity;

dispensing a gel onto an open face of the first film in the cavity;

overlaying the first film and gel with a second film and placing the second mold half to sandwich the films together between the opposing sealing surfaces;

expelling any air from between the first and second films in the cavity by releasing the vacuum from the cavity and allowing elastic recovery of the first film;

welding the films together between the opposing sealing surfaces to form a gel-filled bladder; and removing the gel-filled bladder from the mold halves.

18. The method of claim 17 further comprising trimming excess film from the gel-filled bladder.

19. The method of claim 17 wherein the welding comprises RF welding.

20. The method of claim 17 wherein the welding comprises electrical impulse welding, ultrasonic welding, inductive heating or hot bar sealing.

* * * * *